United States Patent
Grinshpun et al.

(10) Patent No.: US 9,838,893 B2
(45) Date of Patent: Dec. 5, 2017

(54) SYSTEM AND METHOD FOR COOPERATIVELY CONTROLLING AN APPLICATION

(71) Applicant: ALCATEL-LUCENT USA INC., Murray Hill, NJ (US)

(72) Inventors: Edward Grinshpun, Freehold, NJ (US); David Faucher, Guthrie Center, IA (US); Marty Reiman, Maplewood, NJ (US); Sameerkumar Sharma, Holmdel, NJ (US); Theodore Sizer, Little Silver, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 61 days.

(21) Appl. No.: 14/750,844

(22) Filed: Jun. 25, 2015

(65) Prior Publication Data
US 2016/0381698 A1    Dec. 29, 2016

(51) Int. Cl.
*H04W 72/12* (2009.01)
*H04W 24/08* (2009.01)
*H04W 28/02* (2009.01)
*H04L 29/06* (2006.01)

(52) U.S. Cl.
CPC ......... *H04W 24/08* (2013.01); *H04L 65/4084* (2013.01); *H04L 65/80* (2013.01); *H04W 28/0252* (2013.01)

(58) Field of Classification Search
None
See application file for complete search history.

(56) References Cited

U.S. PATENT DOCUMENTS

| 8,949,440 | B2 | 2/2015 | Grinshpun et al. |
| 2009/0110087 | A1* | 4/2009 | Liu ............... H04L 1/0021 375/260 |
| 2010/0056163 | A1 | 3/2010 | Schmidt et al. |

(Continued)

FOREIGN PATENT DOCUMENTS

WO    WO-2013163077 A1    10/2013

OTHER PUBLICATIONS

International Search Report and Written Opinion of the International Searching Authority from corresponding International Application No. PCT/US2016/038285, dated Sep. 26, 2016.

(Continued)

*Primary Examiner* — Chi H Pham
*Assistant Examiner* — Shick Hom
(74) *Attorney, Agent, or Firm* — Harness, Dickey & Pierce, P.L.C.

(57) ABSTRACT

The cooperative controlling of an operation of an application that is used by a user equipment is implemented in a wireless network by obtaining scheduled shared resource rate information and channel condition information for bearers sharing network resources. User equipment policies for the user equipment associated with the bearers can be performed based on the scheduled shared resource rate information, the channel condition information, and available video rate information in order to invoke throughput restrictions for the user equipment. The user equipment policies can be used by application functions to cooperatively control the operation of applications among a number of user equipments.

18 Claims, 9 Drawing Sheets

(56) References Cited

U.S. PATENT DOCUMENTS

| | | |
|---|---|---|
| 2010/0103862 A1 | 4/2010 | Ulupinar et al. |
| 2010/0234031 A1 | 9/2010 | Lidron |
| 2010/0290394 A1 | 11/2010 | Noldus |
| 2011/0039562 A1* | 2/2011 | Balasubramanian ...................... H04W 36/0033 455/436 |
| 2012/0203909 A1 | 8/2012 | Kavanaugh et al. |
| 2012/0315935 A1 | 12/2012 | Wang Helmersson et al. |
| 2013/0012157 A1 | 1/2013 | Zhu |
| 2013/0100806 A1 | 4/2013 | Wang et al. |
| 2013/0286879 A1 | 10/2013 | ElArabawy et al. |
| 2014/0233439 A1 | 8/2014 | Hong et al. |
| 2014/0357300 A1 | 12/2014 | Hao et al. |
| 2014/0389208 | 12/2014 | Karlsson et al. |
| 2015/0195746 A1* | 7/2015 | Franklin ............... H04W 28/22 370/230 |
| 2015/0278245 A1* | 10/2015 | Sagar ................ G06F 17/30174 707/610 |
| 2015/0365829 A1 | 12/2015 | Grayson et al. |
| 2016/0227385 A1 | 8/2016 | Ahmad et al. |

OTHER PUBLICATIONS

3GPP TR 23.705, V0.2.0, (release 12), Feb. 2013.

* cited by examiner

FIG. 1
(CONVENTIONAL)

FIG. 2
(CONVENTIONAL)

SYSTEM AND METHOD FOR COOPERATIVELY CONTROLLING AN APPLICATION

BACKGROUND OF THE INVENTION

Field of the Invention

Example embodiments relate generally to a system and method for cooperative application control using Long-Term Evolution (LTE) Radio Access Network (RAN) metrics.

Related Art

Figure 1:
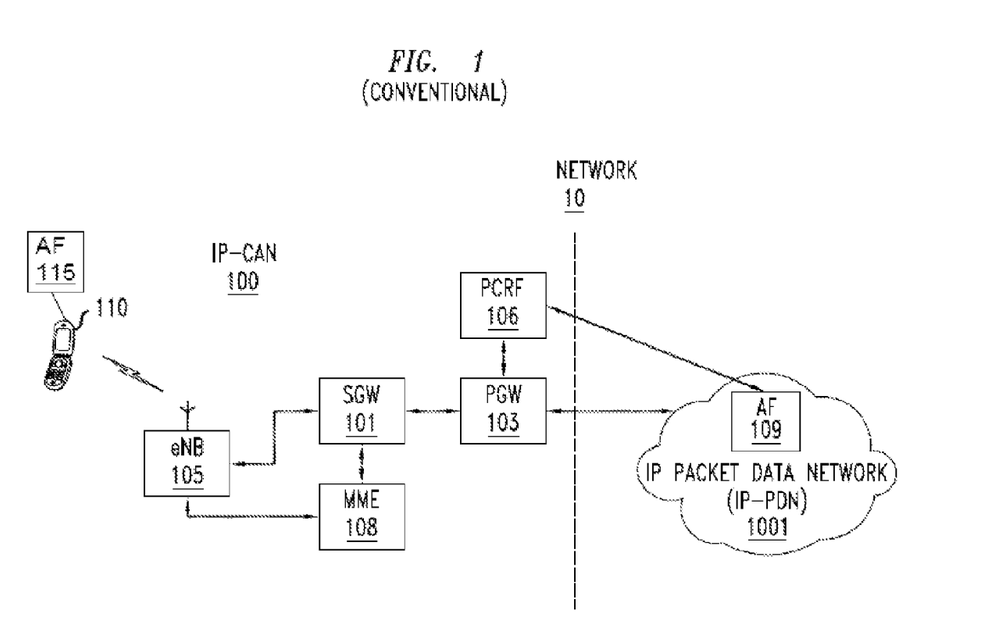
FIG. 1 illustrates a conventional $3^{rd}$ Generation Partnership Project Long-Term Evolution (3GPP LTE) network.

FIG. 1 illustrates a conventional network 10 with mobile User Equipment (UE) 110 connected to the Internet Protocol (IP) Packet Data Network (IP-PDN) 1001 (also referred to as internet) wirelessly via $3^{rd}$ Generation Partnership Project Long-Term Evolution (3GPP LTE) IP Connectivity Network (IP-CAN) 100 (also referred to as a wireless network). The IP-CAN 100 generally includes: a serving gateway (SGW) 101; a packet data network (PDN) gateway (PGW) 103; a policy and charging rules function (PCRF) 106; a mobility management entity (MME) 108, and an Evolved Node B (eNB) 105 (also referred to as cell). The IP-PDN 1001 includes Application Function (AF) 109 which may include application or proxy servers, media servers, email servers, other connected UEs, etc.

Within the IP-CAN 100, the eNB 105 is part of what is referred to as an Evolved Universal Mobile Telecommunications System (UMTS) Terrestrial Radio Access Network (EUTRAN), and the portion of the IP-CAN 100 including the SGW 101, the PGW 103, and the MME 108 is referred to as an Evolved Packet Core (EPC). Although only a single eNB 105 is shown in FIG. 1, it should be understood that the EUTRAN may include any number of eNBs. Similarly, although only a single SGW, PGW and MME are shown in FIG. 1, it should be understood that the EPC may include any number of these core network elements.

The eNB 105 provides wireless resources and radio coverage for UEs including UE 110. For the purpose of clarity, only one UE is illustrated in FIG. 1. However, any number of UEs may be connected (or attached) to the eNB 105. The eNB 105 is operatively coupled to the SGW 101 and the MME 108. The UE 110 may also include an application function 115 that may run applications on the UE 110, where the applications may be sourced from an application or proxy servers, media servers, email servers, other connected UEs, etc.

The SGW 101 routes and forwards user data packets, while also acting as the mobility anchor for the user plane during inter-eNB handovers of UEs. The SGW 101 also acts as the anchor for mobility between $3^{rd}$ Generation Partnership Project Long-Term Evolution (3GPP LTE) and other 3GPP technologies. For idle UEs, the SGW 101 terminates the downlink data path and triggers paging when downlink data arrives for UEs.

The PGW 103 provides connectivity between the UE 110 and the external packet data networks (e.g., the IP-PDN) by being the point of entry/exit of traffic for the UE 110. As is known, a given UE may have simultaneous connectivity with more than one PGW for accessing multiple PDNs.

The PGW 103 also performs policy enforcement, packet filtering for UEs, charging support, lawful interception and packet screening, each of which are well-known functions. The PGW 103 also acts as the anchor for mobility between 3GPP and non-3GPP technologies, such as Worldwide Interoperability for Microwave Access (WiMAX) and $3^{rd}$ Generation Partnership Project 2 (3GPP2 (code division multiple access (CDMA) 1× and Enhanced Voice Data Optimized (EvDO)).

Still referring to FIG. 1, the eNB 105 is also operatively coupled to the MME 108. The MME 108 is the control-node for the EUTRAN, and is responsible for idle mode UE paging and tagging procedures including retransmissions. The MME 108 is also responsible for choosing a particular SGW for a UE during initial attachment of the UE to the network, and during intra-LTE handover involving Core Network (CN) node relocation. The MME 108 authenticates UEs by interacting with a Home Subscriber Server (HSS), which is not shown in FIG. 1.

Non Access Stratum (NAS) signaling terminates at the MME 108, and is responsible for generation and allocation of temporary identities for UEs. The MME 108 also checks the authorization of a UE to camp on a service provider's Public Land Mobile Network (PLMN), and enforces UE roaming restrictions. The MME 108 is the termination point in the network for ciphering/integrity protection for NAS signaling, and handles security key management.

The MME 108 also provides control plane functionality for mobility between LTE and 2G/3G access networks with the S3 interface from the SGSN (not shown) terminating at the MME 108.

The Policy and Charging Rules Function (PCRF) 106 is the entity that makes policy decisions and sets charging rules. It has access to subscriber databases and plays a role in the 3GPP architecture as specified in 3GPP TS 23.303 "Policy and Charging Control Architecture". In particular PCRF via PGW may configure wireless bearers, and PCRF also may configure policies on PGW and SGW related to flow control of the packets that belong to a particular bearer. A "bearer" may be understood to be a virtual link, channel, or data flow used to exchange information for one or more applications on the UE 110.

The Application Function (AF) 115 in the UE 110 communicates with the Application Function (AF) 109 via IP-CAN 100 to establish application session, receive and send application content and other application specific information. AF 109 may be a server in IP-PDN, or a peer end user device or a combination of these. AF 109 may register with PCRF 106 to receive application level policy that may enable adapting application behavior to help improve end user quality of experience.

Figure 2:
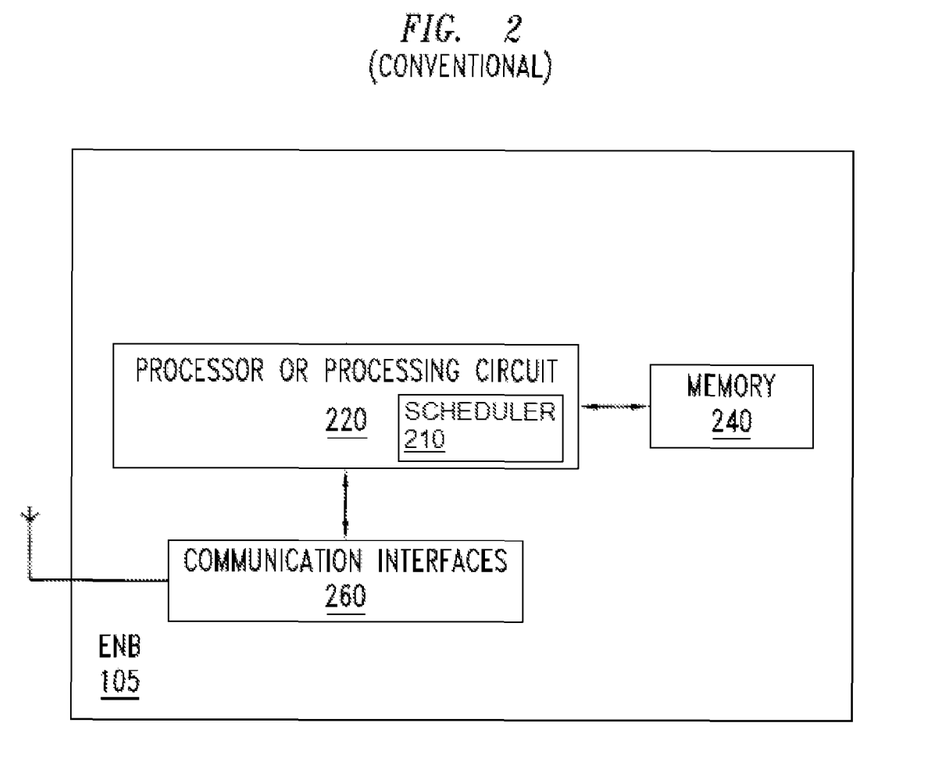
FIG. 2 is a diagram of a conventional E-UTRAN Node B (eNB)

FIG. 2 is a diagram of a conventional E-UTRAN Node B (eNB) 105. The eNB 105 includes: a memory 240; a processor 220; a scheduler 210; and communication interfaces 260. The processor 220 may also be referred to as a core network entity processing circuit, an EPC entity processing circuit, etc. The processor 220 controls the function of eNB 105 (as described herein), and is operatively coupled to the memory 240 and the communication interfaces 260.

The eNB may include one or more cells or sectors with a shared wireless resource pool serving UEs within individual geometric coverage sector areas. Each cell individually may contain elements depicted in FIG. 2. Throughout this document the terms eNB, cell or sector shall be used interchangeably.

Still referring to FIG. 2, the communication interfaces 260 include various interfaces including one or more transmitters/receivers connected to one or more antennas to transmit/receive (wireline and/or wirelessly) control and data signals to/from UEs or via a control plane or interface to other EPC network elements and/or RAN elements. The scheduler 210 schedules control and data communications that are to be transmitted and received by the eNB 105 to and from UEs 110. The scheduler 210 may include a dedicated processor for performing these scheduling functions, or the scheduler 210 may reside in processor 220 (as shown in FIG. 2). The memory 240 may buffer and store data that is being transmitted and received to and from eNB 105.

Every Transmission Time Interval (TTI), typically equal to 1 millisecond, the scheduler may allocate a certain number of Physical Resource Blocks (PRBs) to different bearers carrying data over the wireless link in the Downlink (from eNB 105 to UE 110) and Uplink (from UE 110 to eNB 105) directions. The scheduler may also determine Modulation and Coding Schema (MCS) that may define how many bits of information may be packed into the allocated number of PRBs. The latter is defined by the 3GPP TS36.213 tables 7.1.7.1-1 and 7.1.7.2.1-1, which presents a lookup table for a number of bits of data that may be included in PRBs sent per TTI for a given allocated number of PRBs and a MCS value. MCS is computed by the scheduler using Channel Quality Indicator (CQI) values reported by the UE 110 that in turn may be derived from measured by the UE 110 wireless channel conditions in the form of Signal to Interference and Noise Ratio (SINR).

Scheduler 210 may make PRB allocation decisions within the shared wireless resource pool based upon a Quality of Service (QoS) Class Identifier (QCI), which represents traffic priority hierarchy. There are nine QCI classes currently defined in LTE, with 1 representing highest priority and 9 representing the lowest priority. QCIs 1 to 4 are reserved for Guaranteed Bitrate (GBR) classes for which the scheduler maintains certain specific data flow QoS characteristics. QCIs 5 to 9 are reserved for various categories of Best Effort traffic.

While the scheduler operations are not standardized, there are certain generic types of schedulers that are generally accepted. Examples include strict priority scheduler (SPS) and proportional weighted fair share scheduler (PWFSS). Both types try to honor GBR needs first by allocating dedicated resources to meet whenever possible the GBR bearer throughput constraints while leaving enough resources to maintain certain minimal data traffic for non-GBR classes. The SPS allocates higher priority classes with all the resources that may be needed (except for a certain minimal amount of resources to avoid starving lower priority classes), and lower priority classes generally receive the remaining resources. The PWFSS gives each non-GBR QCI class certain weighted share of resources that may not be exceeded unless unutilized resources are available.

It should be understood that with a Virtual Radio Access Network (VRAN) architecture, various eNB functions and components may be distributed across multiple processing circuits and multiple physical nodes within a VRAN cloud. Likewise, with a virtualized wireless core network architecture, various functions and components of MME 108, P-GW 103, S-GW 101, PCRF 106 may be distributed across multiple processing circuits and multiple physical nodes within a Virtualized Wireless Core cloud.

Hypertext Transfer Protocol (HTTP) Adaptive Streaming (HAS) is a widely adopted technique to deliver Video on Demand (VoD) services. Video is segmented into short segments (typically 2 to 10 seconds in duration), where each segment is encoded at multiple video formats/resolutions and rates. A HAS client maintains a cache buffer for video data received at the HAS client in order to smooth out any variability of network conditions. The HAS client runs a Rate Determination Algorithm (RDA) to select a video rate for the next video data segment (located in a Content Cache of pre-encoded video segments) based on the HAS client's estimates of network throughput (which the HAS client may obtain by dividing a video segment size by the time elapsed between sending request for the video segment and completing the video segment download), the HAS client's cache buffer fullness and various heuristics. A higher video rate for a segment yields sharper picture quality and better end user quality of experience (QoE) at the expense of larger video segment sizes and more bandwidth required to deliver such segments. On the other hand, a lower video rate requires less bandwidth resources to deliver the video segment, but may be associated with more blurry or sometimes blocky picture quality. The use of various heuristics may ensure a certain level of stability in rate selection for different video segments, as frequent variations in the rate selection from one video segment to another may contribute to a low user QoE.

Different variations of HAS have conventionally been implemented by application vendors. 3GPP and International Telecommunication Union (ITU) came up with the Dynamic Adaptive Streaming over HTTP (DASH) standard to standardize the format in which HAS application clients receive information about available video segment formats and locations of the segments, which are described in the DASH Media Protocol Descriptor (MPD) file (also called a manifest file).

Conventionally, under severe wireless network congestion conditions, a number of UE's able to watch mobile adaptive streaming video over a Best Effort wireless link is often times significantly less than it could be, based upon available wireless link capacity under the congestion conditions. One reason for this is mobile hypertext transfer protocol (HTTP) Adaptive Streaming (HAS) applications are greedy and non-cooperative. Under congestion conditions, HAS applications (which currently predominantly use a Best Effort LTE service class for most networks) suffer from lack of awareness about available RAN resources. Therefore, the UE's, and the HAS applications being run on the UE's, are unable to maximize the available RAN resources in a cooperative fashion. In particular, each HAS application individually tries to maximize its share of RAN resources within the limits determined by an individual video segment rate determination algorithm (RDA). As such, each mobile HAS application selects a highest video play rate allowed by the RDA estimated network throughput. If the play-ahead buffer is not full (i.e., adaptive streaming application is in a "hungry state"), HAS application tries to obtain video segments as quickly as possible, resulting in RAN resource consumption significantly higher than a selected video rate. As a result of such individually greedy behavior, under RAN congestion conditions a number of UEs that actually receive HAS video may be significantly less than it may be with the cooperative utilization of the available RAN resources.

Figure 3:
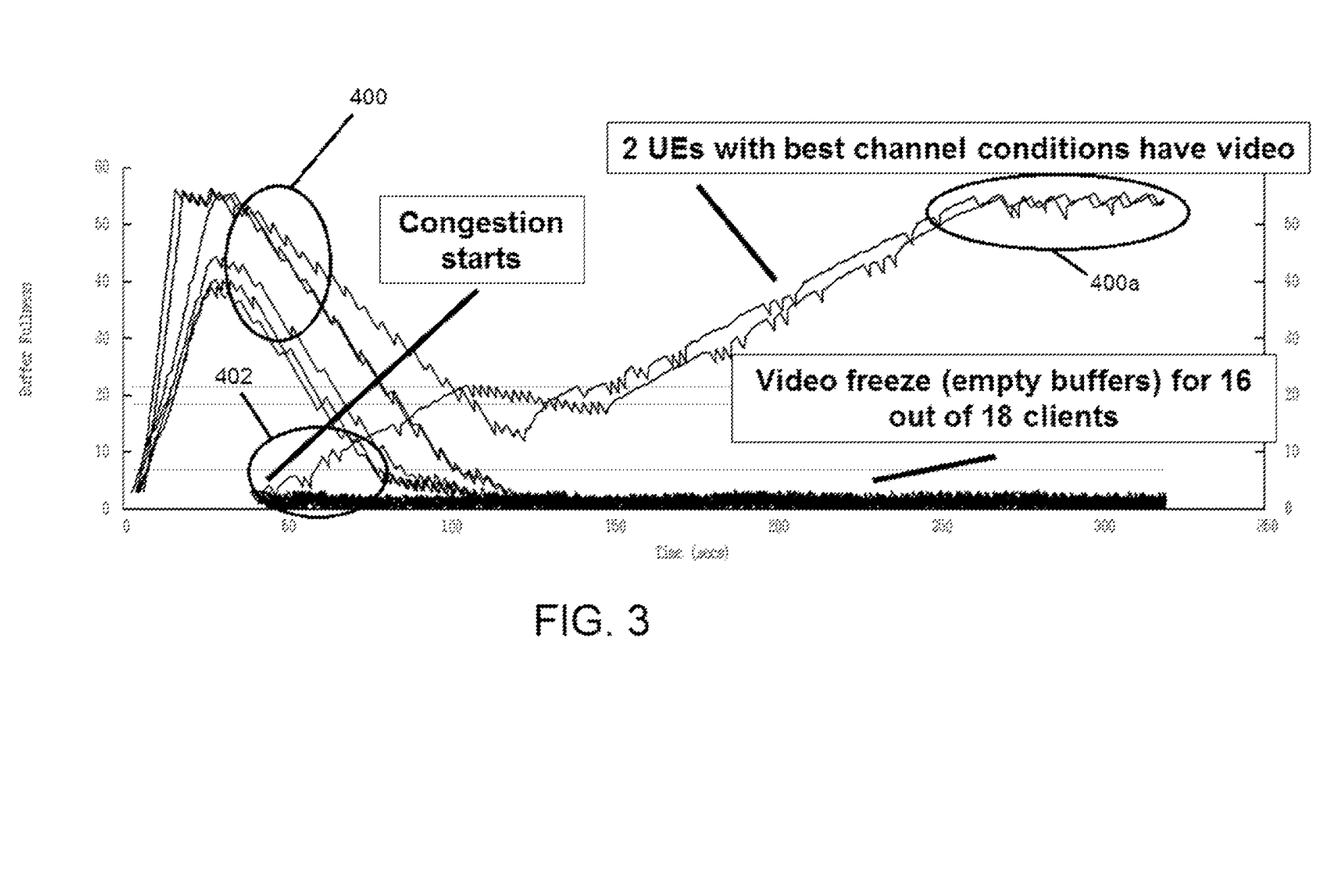
FIG. 3 is a graphical depiction of a simulation result for a conventional wireless network with hypertext transfer protocol adaptive streaming (HAS) clients being served during a network congestion time period.

FIG. 3 graphically depicts simulation results for a conventional wireless network with 18 Best Effort HAS clients served by a same 10 Mhz cell (where other network traffic may also be present, but is not shown). An original 6 HAS clients 400 are later joined by 12 more HAS clients 402, thus creating a congestion condition. All HAS clients in this simulation are watching videos encoded at multiple video rates with the lowest available video rate being about 500 Kbit/sec. After the congestion starts, only 2 clients 400a (out of 18 total clients) that have the best channel conditions have video (non-empty play-ahead buffers). The remaining 16 clients have worse channel conditions, so the fair share of physical resource blocks (PRBs) that the scheduler allocates to them is not sufficient to sustain even the lowest available video rate. Therefore, only 2 clients out of a total of 18 clients may be served while running HAS applications in a conventional network.

Figure 4:
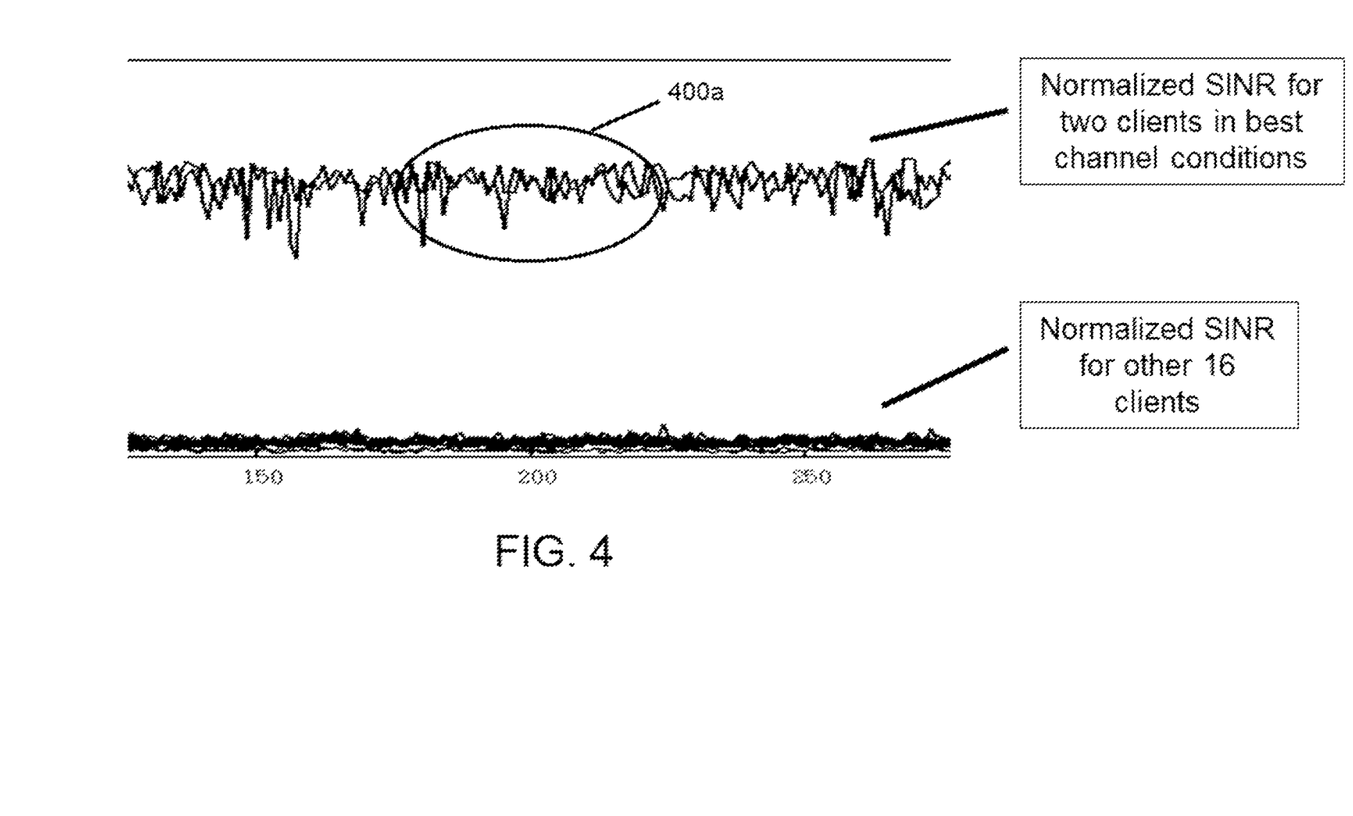
FIG. 4 graphically depicts the HAS clients being served over an extended period of time in the conventional wireless network simulation of FIG. 3.

Conventionally, a solution exists for optimizing UE's running HAS applications that is associated with enforcing throughput limits at the eNB for each individual HAS client, by assigning each HAS client a Guaranteed Bit Rate (GBR) service class, instead of Best Effort (for instance). However, this solution is not feasible, for at least two reasons. First, such a solution would be expensive to implement. In particular, some network operators consider GBR economically impractical, especially in an environment catering to flat rate data plans. Second, UEs in worse channel conditions may consume significantly more resources (PRBs) to maintain a guaranteed rate, which may further exacerbate the problems associated with congestion conditions. For example, FIG. 4 graphically depicts that out of the 18 UEs shown in FIG. 3, only two UEs 400a are experiencing a 'best channel condition' state, whereas the remaining 16 UEs are in worse channel conditions. The graphical representation of FIGS. 3 and 4 may be considered typical channel conditions for purposes of HAS applications. While the issues related to UEs in worse channel conditions may be alleviated by using an Adaptive GBR (AGBR) service class technique where the amount of resources allocated to a UE is also limited by the channel conditions, the telecommunication industry is conventionally only studying the feasibility of adopting an AGBR approach, as the majority of HAS traffic utilizes a Best Effort approach.

Conventionally, there is no mechanism for application level admission control and resource distribution policies that would be capable of enforcing HAS clients to use Best Effort wireless resources in a cooperative fashion, while maximizing the number of UEs able to play video under congestion conditions. Likewise, conventionally there are no admission control and resource distribution policies to prevent UEs in poor channel conditions (below the lowest required video rate) from usurping network resources while attempting to play HAS video, nor are there any conventional mechanisms for distributing available RAN resources properly among "admitted" UEs to ensure that all admitted UEs successfully play video while also maximizing the number of admitted UEs.

SUMMARY OF INVENTION

At least one example embodiment relates to a method of cooperatively controlling an operation of an application in a wireless network.

In one embodiment, the method includes obtaining, by one or more processors of at least one network node, scheduled shared resource rate information and channel condition information for bearers sharing network resources; receiving, by the one or more processors, available video rate information from one or more application functions associated with the bearers; computing, by the one or more processors, user equipment (UE) policies for user equipments (UEs) associated with the bearers based on the scheduled shared resource rate information, the channel condition information, and the available video rate information, the UE policies including throughput restrictions for the UEs; and exporting, by the one or more processors, the UE policies to the one or more application functions to cooperatively control an operation of an application being used by at least one of the UEs.

In one example embodiment the method further includes ordering the UEs based on a channel condition metric derived from the channel condition information; and invoking admission controls for the UEs using the channel condition metric and the ordering of the UEs.

In one example embodiment the method includes wherein the invoking of admission controls includes admitting a first subset of the UEs to receive application services if a sum of an average aggregate value of the scheduled shared resource rate required to support playing videos with a minimal available video rate does not exceed an average aggregate rate of available network resources, wherein the average aggregate rate of available network resources includes a configurable margin factor, wherein higher values of the channel condition metric correspond with better channel conditions.

In one example embodiment the method includes wherein the scheduled shared resource rate information is an average aggregate physical resource block (PRB) rate that includes an average number of physical resource blocks (PRBs) expected to be allocated to all bearers carrying hypertext transfer protocol adaptive streaming (HAS) application traffic.

In one example embodiment the method includes wherein the channel condition information includes an average number of useful bits per physical resource block (PRB), the useful bits being a number of data bits that are not retransmitted bits.

In one example embodiment the method includes rein the receiving of the available video rate information includes receiving hypertext transfer protocol adaptive streaming (HAS) video rates from one of a HAS client and a HAS network content server associated with the one or more application functions associated with the bearers.

In one example embodiment, the method includes wherein the computing of the UE policies includes calculating per UE tuples indicating the throughput restrictions for the UEs.

In one example embodiment, the method includes wherein the throughput restrictions include a maximal allowed video bitrate and a maximal allowed throughput for the UEs.

In one example embodiment, the method includes wherein the computing of the UE policies includes maximizing a Quality of Experience (QoE) utility function for the first subset of UEs.

At least one embodiment relates to at least one network node.

In one example embodiment, the at least one network node includes one or more processors configured to, obtain scheduled shared resource rate information and channel condition information for bearers sharing network resources, receive available video rate information from one or more application functions associated with the bearers, compute user equipment (UE) policies for user equipments (UEs) associated with the bearers based on the scheduled shared resource rate information, the channel condition information, and the available video rate information, the UE policies including throughput restrictions for the UEs, and export the UE policies to the one or more application functions to cooperatively control an operation of an application being used by at least one of the UEs.

In one example embodiment, the at least one network node includes wherein the one or more processors is further configured to, order the UEs based on a channel condition metric derived from the channel condition information, and invoke admission controls for the UEs using the channel condition metric and the ordering of the UEs.

In one example embodiment, the at least one network node includes wherein the one or more processors invokes the admission controls by admitting a first subset of the UEs to receive application services if a sum of an average aggregate value of the scheduled shared resource rate required to support playing videos with a minimal available video rate does not exceed an average aggregate rate of available resources, wherein the average aggregate rate of available resources includes a configurable margin factor, wherein higher values of the channel condition metric correspond with better channel conditions.

In one example embodiment, the at least one network node includes wherein the scheduled shared resource rate information is an average aggregate physical resource block (PRB) rate that includes an average number of physical resource blocks (PRBs) expected to be allocated to all bearers carrying hypertext transfer protocol adaptive streaming (HAS) application traffic.

In one example embodiment, the at least one network node includes wherein the channel condition information includes an average number of useful bits per physical resource block (PRB), the useful bits being a number of data bits that are not retransmitted bits.

In one example embodiment, the at least one network node includes wherein the one or more processors receives the available video rate information by receiving hypertext transfer protocol adaptive streaming (HAS) video rates from one of a HAS client and a HAS network content server associated with the one or more application functions associated with the bearers.

In one example embodiment, the at least one network node includes wherein the one or more processors computes the UE policies by calculating per UE tuples indicating the throughput restrictions for the UEs.

In one example embodiment, the at least one network node includes wherein the throughput restrictions include a maximal allowed video bitrate and a maximal allowed throughput for the UEs.

In one example embodiment, the at least one network node includes wherein the one or more processors computes the UE policies by maximizing a Quality of Experience (QoE) utility function for the first subset of UEs.

In one example embodiment, the at least one network node includes wherein the one or more processors is further configured to calculate a minimal delay before requesting a next video segment based on the maximal allowed video bitrate.

At least one example embodiment relates to a non-transitory computer readable medium.

In one example embodiment, the non-transitory computer readable medium includes a program including instructions to obtain scheduled shared resource rate information and channel condition information for bearers sharing network resources, receive available video rate information from one or more application functions associated with the bearers, compute user equipment (UE) policies for user equipments (UEs) associated with the bearers based on the scheduled shared resource rate information, the channel condition information, and the available video rate information, the UE policies including throughput restrictions for the UEs, and export the UE policies to the one or more application functions to cooperatively control an operation of an application being used by at least one of the UEs.

At least one example embodiment relates to a computer program on a non-transitory computer readable medium including software code.

In one example embodiment, the computer program on a non-transitory computer readable medium including software code is configured to perform the steps of obtaining, by one or more processors of at least one network node, scheduled shared resource rate information and channel condition information for bearers sharing network resources; receiving, by the one or more processors, available video rate information from one or more application functions associated with the bearers; computing, by the one or more processors, user equipment (UE) policies for user equipments (UEs) associated with the bearers based on the scheduled shared resource rate information, the channel condition information, and the available video rate information, the UE policies including throughput restrictions for the UEs; and exporting, by the one or more processors, the UE policies to the one or more application functions to cooperatively control an operation of an application being used by at least one of the UEs.

BRIEF DESCRIPTION OF THE DRAWINGS

The above and other features and advantages of example embodiments will become more apparent by describing in detail, example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, field programmable gate array (FPGAs), application specific integration circuit (ASICs), the program code or code segments to perform the necessary tasks may be stored in a machine or computer readable medium such as a storage medium, such as a non-transitory storage medium. A processor(s) may perform these necessary tasks.

Specific structural and functional details disclosed herein are merely representative for purposes of describing example embodiments. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be any non-transitory storage medium such as magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Basic Methodology:

At least one example embodiment may relate to a method for calculating a HAS application level admission control and a resource consumption policy using LTE RAN metrics.

The policy may then communicated to a HAS application function, where the policy may be used to influence application function adaptive streaming rate selection decisions and pacing for next segment requests, which allows HAS applications utilizing Best Effort Wireless connections under congestion conditions to cooperate and maximize an effectiveness of available RAN resources.

The method may be implemented using Best Effort wireless application traffic, without making modifications to the wireless RAN scheduler. The method may utilize a Network Insights Function (NIF) 405 (described in relation to FIG. 5, below) that may compute link level LTE metrics based upon LTE metric information extracted from an eNB scheduler and MAC layers. In particular, the method may utilize a LTE RAN scheduler, MAC and RLC information, in order to enable HAS clients to use the Best Effort wireless resources in a cooperative fashion while maximizing a number of UEs with video under congestion, which may be accomplished in two basic parts, described below.

Part 1: Application level admission control may be implemented while maximizing the number of admitted UEs. This admission control may free some RAN resources, by not admitting UEs experiencing very poor channel conditions that are unable to receive a lowest (minimum) necessary video rate for playing HAS video due to resource and/or channel limitations. This admission control may continue to be enforced until affected UEs stop requesting video segments, or until the network congestion is resolved.

Part 2: Implementing policies that enforce a proper distribution of available Best Effort resources among the "admitted" UEs, in order to ensure that all admitted UEs receive video. This enforcement may be accomplished via application level policies that may (i) limit the maximal video rate that UEs in "better" conditions may select and (ii) limit the maximal application level throughput when HAS UEs are in a "hungry state" (i.e., play-ahead buffers not full).

The method may work best when the RAN resource pool (consisting of PRBs) of HAS clients may be separated from the other Best Effort traffic resources, but the method may be extended to a scenario where these resource pools are combined.

Inputs for the Admission Control and Policy Generation for UEs Using Best Effort (BE) Wireless Connections:

The inputs that may be used in the method (i.e., wireless RAN and HAS video session metrics), may include the following.

A) A number of UEs attempting to access HAS services (e.g., each UEs using a single wireless BE bearer) that may be sharing RAN resource pool (where the resource pool may be the resources associated with a single eNB, for instance). This input may be denoted as "N."

B) HAS video bitrates (measured in bits/sec) that are available for each UE number k. This input may be denoted as $\{r_1^{(k)} < r_2^{(k)} < \ldots < r_{m_k}^{(k)}\}$, where k is the UE index and $m_k$ is the number of different video encoding rates available for the UE.

C) An optional input may include a UE service preference, such as gold, silver, bronze, etc.

D) An average channel condition for each UE k, which may be expressed in the form of an average number of "useful" bits per PRB metric, and denoted as $\bar{\alpha}_k$. The term "useful" bits may be considered bits that are data bits that are not re-transmitted bits. In one embodiment, this input metric may be computed via the method described in U.S. patent application Ser. No. 14/724,352 "System and Method for Controlling an Operation of an Application," the contents of which is incorporated by reference in its entirety.

E) An average shared wireless resource rate (e.g. number of PRBs per second S in the shared resource pool), where this input may be denoted as "S" (for example, for a 20 Mhz eNB, the available shared resources rate may be S=100,000 prbs/sec).

F) An average fraction of shared wireless resources (e.g. of physical resource blocks per second) that are available to be shared among HAS UEs, where this input may be denoted as "x." The product S*x may represent an average rate of wireless resources (e.g. number of PRBs per second) that may be shared among HAS UEs. The product S*x can be considered scheduled shared resource rate information.

General Operations of an Example Method:

A general operation of an example method may include the following basic steps.

I) Receive inputs (where the inputs are listed above).

II) The UEs may be ordered. This ordering may be based upon a decreasing channel conditions metric (which is input (D), above). This ordering may be denoted as follows.

$$\bar{\alpha}_1 \geq \bar{\alpha}_2 \geq \ldots \geq \bar{\alpha}_N. \quad \text{Equation 1}$$

It is noted that higher values for the channel conditions metric may corresponds to better channel conditions. UEs with lower ordering numbers will be admitted before the UEs with higher ordering numbers. If optional service preference classes are also implemented (see input (C), above), the UEs within each service class may be ordered independently, based upon Equation 1, and then inter-class ordering may be established according to a service provider's preferences.

III) Admission control may be implemented. With the UEs ordered according to step (II) above, only the first number N' of UEs that satisfy the following Equation 2 may be admitted.

$$\sum_{k=1}^{N'} \frac{r_1^{(k)}}{\bar{\alpha}_k} \leq \frac{Sx}{(1+\delta)}, \quad \text{Equation 2}$$

Where S and x are from inputs (E) and (F), $\delta$ may be a configurable buffer growth margin (for example, this value may be chosen to be between 0.1 or 0.3), and $r_1^{(k)}$ from the input (B) may be the lowest video rate available for the UE k. The HAS UEs with ordering numbers from N' to N may therefore not be admitted. The policy for these non-admitted UEs may include assigning a 0 (zero) maximal video rate and a 0 (zero) maximal allowed application throughput, which will force these HAS UEs to stop requesting video segments. The left hand side of the Equation 2 represents an average aggregate rate of physical resource blocks per second necessary to support a minimal video rate for all admitted UEs. The right hand side of the Equation 2 represents an average rate of wireless resources (e.g. number of PRBs per second) that may be available to be shared among HAS UEs, reduced by the margin factor (1+$\delta$) to allow a margin for growing play buffer.

IV) For the admitted UE k, a policy may include per UE tuples, which provide throughput restrictions for the UEs, which may be denoted as: $<R^{(k)}_{max}, T^{(k)}_{max}>$, where $R^{(k)}_{max}$ is a maximal allowed video bitrate that may be selected, and $T^{(k)}_{max}$ may be the maximal allowed throughput (where these limitations may restrict how greedy a UE may be in requesting video segments). $T^{(k)}_{max}$ may be used by an application function to calculate a minimal delay $d^{(k)}_n$ before requesting a next video segment n using the following equation.

$$d^{(k)}_n \geq \left[\frac{L^{(k)}_n}{T^{(k)}\max} - t^{(k)}_n\right]^+ \quad \text{Equation (3)}$$

Where $L^{(k)}_n$ may be the length of the segment n known from the MPD or manifest file and $t^{(k)}_n$ may be the download time of the segment n, as measured by a Rate Determination function.

V) A policy calculation may be performed by maximizing a Quality of Experience (QoE) utility function for aggregate HAS user experience of the users served by the cell/sector, as follows.

$$U=a*\text{Average}_k(R_{max}^{(k)})-b*\text{Variance}_k(R_{max}^{(k)}) \quad \text{Equation 4}$$

Where a and b may be configurable parameters.

VI) An ordering of the UEs in Equation (1) implies that the UEs in the front of the ordering shall have rates higher than the UEs in the back, as indicated by the equation below.

$$R_{max}^{(1)} \geq R_{max}^{(2)} \geq \ldots \geq R_{max}^{(N')} \quad \text{Equation 5}$$

This may significantly reduce a number of possible permutations. Namely, a total number of permutations for N' number of UEs and m different video rate classes may be computed as follows.

$$S(N', m) = \frac{(N'+m-1)!}{(N'-1)!(m-1)!} \quad \text{Equation 6}$$

This method may allow for the use of a simple complete enumeration for calculating a maximal value of the utility function. For example, for 14 admitted users and 4 different video rates (as in example shown in FIG. 3, the number of permutations is 9520). The maximal value of the Utility function may be computed by computing the value of the Utility function for each permutation and then selecting the maximal value among the computed.

Specific Example Method:

Based on an understanding of the general methodology described above, the following discussion relates to a specific example system and method that is shown in conjunctions with FIGS. 5-8.

Figure 5:
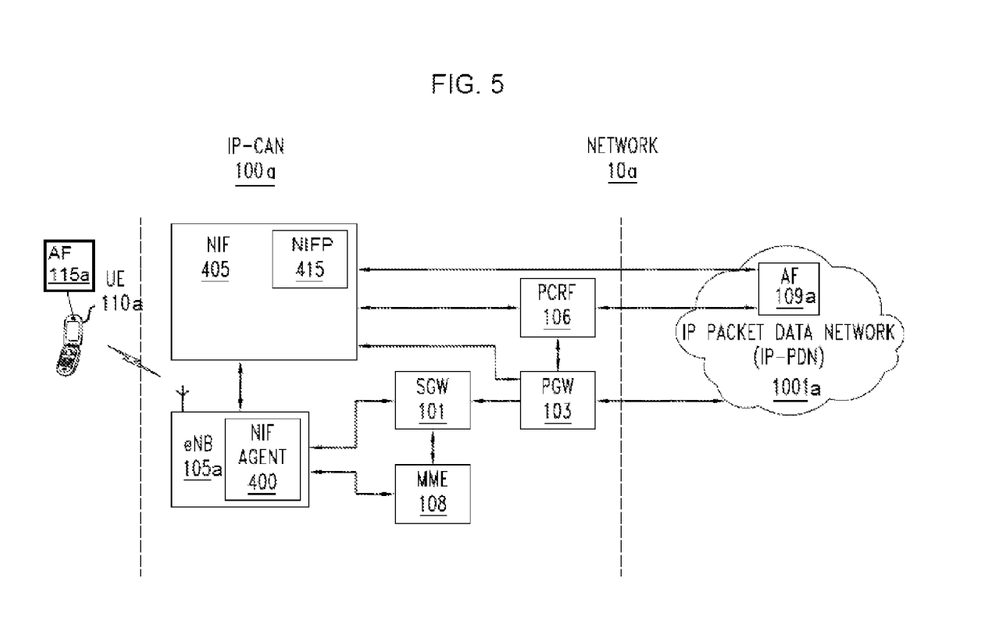
FIG. 5 illustrates a reconfigured 3GPP LTE network, in accordance with an example embodiment.

FIG. 5 illustrates a reconfigured network 10a, according to an example embodiment. The network 10a may include a network insight function (NIF) agent 400 that may be located in a reconfigured eNB 105a (as shown in better detail in FIG. 6). A separate network insight function (NIF) 405 may be in the reconfigured IP-CAN 100a. The NIF 405 may include a network insight function policy-maker (NIFP) 415. The NIF 405 (and associated NIFP 415) may be capable of collecting bearer metrics (described by the list of inputs, above) from more than one reconfigured eNB 105a, although only one eNB 105a is shown in FIG. 5, for simplicity. The NIF 405 may perform the admission control and policy making (as described in the general operations, listed above). The NIF 405 may then be used to cooperatively control application functions 109a/115a that may be located in the respective reconfigured IP-PDN 1001a and/or the reconfigured UE 110a. The application function 109a may be a dedicated stand-alone server in the reconfigured IP-PDN 1001a.

Figure 6:
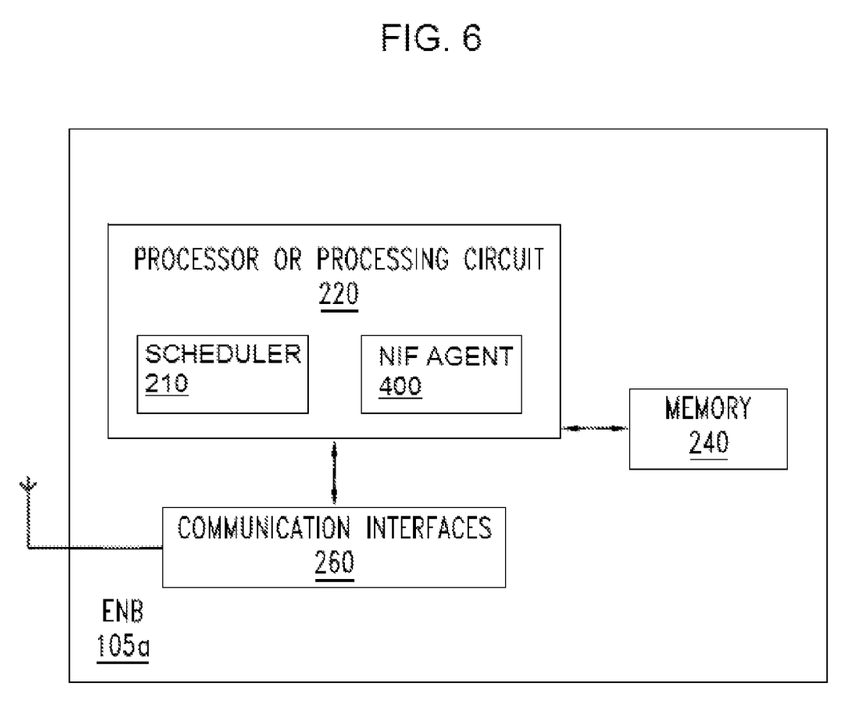
FIG. 6 illustrates a reconfigured E-UTRAN Node B (eNB), in accordance with an example embodiment.

FIG. 6 illustrates a reconfigured eNB 105a, in accordance with an example embodiment. Specifically, the eNB 105a may include a NIF agent 400. The NIF agent 400 may be a stand-alone dedicated processor that may be a special purpose processor existing in the eNB 105a. Or, the NIF agent 400 may be located in processor 220, as shown in FIG. 6. The functions of the NIF agent 400 are described below in conjunction with the method steps outlined in FIG. 8.

Figure 7:
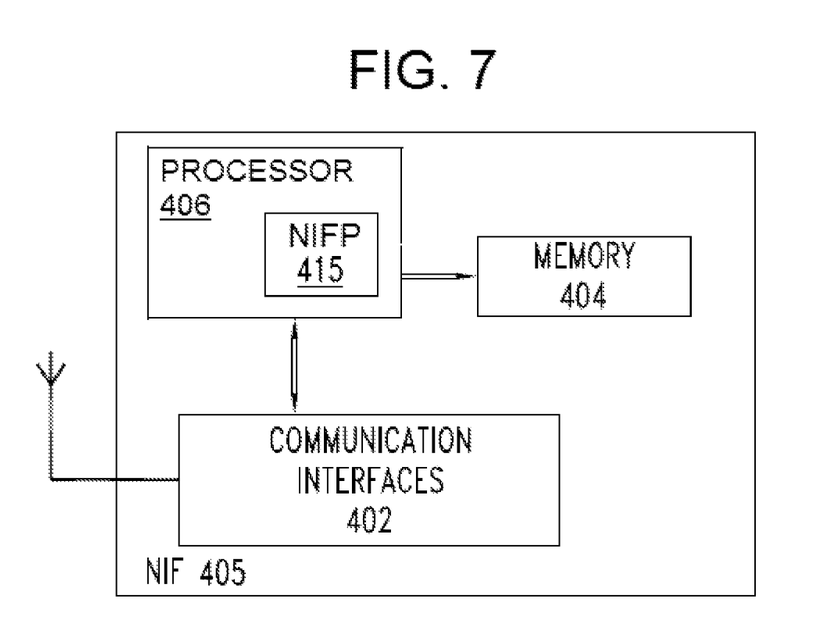
FIG. 7 illustrates a Network Insights Function (NIF) server, in accordance with an example embodiment.

FIG. 7 illustrates the NIF 405, in accordance with an example embodiment. NIF 405 (and associated NIFP 415) may be a dedicated stand-alone server (as shown in FIGS. 5 and 7). Alternatively, the NIF 405 (and NIFP 415) may be located in another existing network node in the reconfigured IP-CAN 100a, such as MME 108, SGW 101, or PCRF 106 or PGW 103. NIF 405 may include a processor 406 that controls the operations of NIF 405. NIFP 415 may be a separate stand-alone special purpose processor. Or, alternatively, NIFP 415 may reside within processor 406, as shown in FIG. 7. The function of NIFP 415 is described below in conjunction with the method steps outlined in FIG. 8. NIF 402 may also have communication interfaces 402 capable of communicating with one or more eNBs 105a, PCRF 106, and application functions 109a and/or 115a. A memory 404 is also provided to buffer data.

With the VRAN architecture various components of NIF Agent 400 and NIF 405 may be distributed across multiple processing circuits and multiple physical nodes within VRAN or Virtualize Wireless Core clouds.

Figure 8:
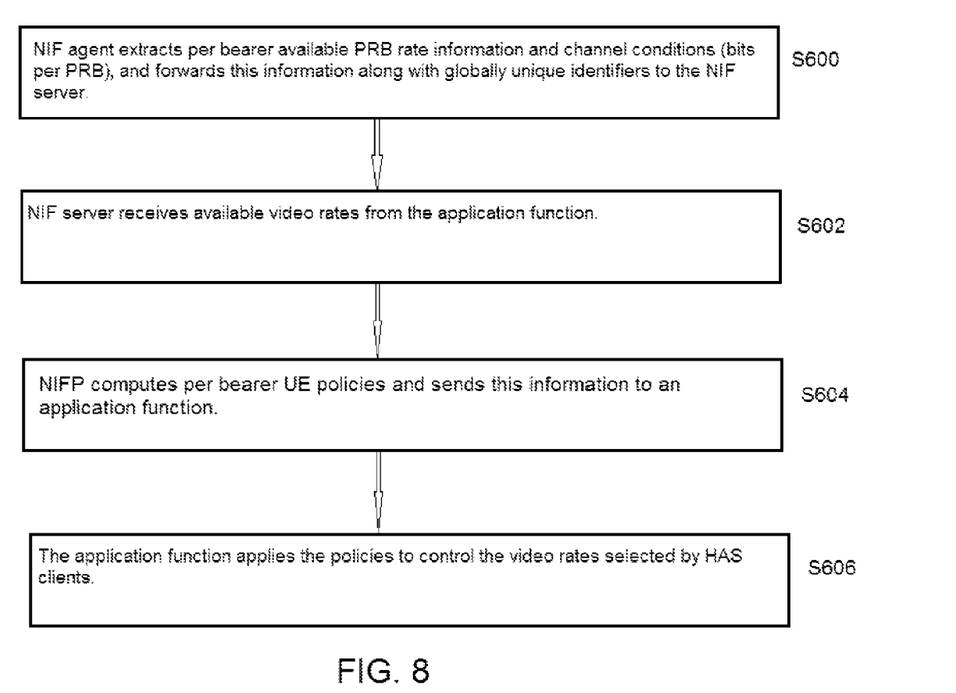
FIG. 8 is a method flowchart describing a method of cooperatively controlling an operation of an application in a wireless network, in accordance with an example embodiment.

FIG. 8 is a method flowchart describing a method of cooperatively controlling an application within the reconfigured network 10a, in accordance with an example embodiment. In particular, FIG. 8 describes the functions of the structure shown in FIG. 5.

In step S600 of FIG. 8, processor 220 of eNB 105a may cause NIF agent 400 to extract per bearer available PRB rate information (from which input E, listed in the list of inputs above, may be derived by the NIF server 405, for example by multiplying the per bearer available PRB rate by the number of HAS clients), together with per bearer channel information (per bearer number of bites per PRB, which is input D, listed above). The NIF agent 400 may then pass this information together with globally unique bearer identifiers for the respective bearer to the NIF server 405. In an embodiment, calculating per bearer available PRB rate information may be accomplished by calculating an average number of PRBs that may be expected to be allocated for a particular bearer in accordance with the procedures described in U.S. patent application Ser. No. 14/534,968 "System and Method for Determining Cell Congestion Level," the entire contents of which is incorporated by reference in its entirety. In an embodiment, the computation of per bearer number of bits per PRB may be accomplished by the procedures described in U.S. patent application Ser. No. 14/724,352 "System and Method for Controlling an Operation of an Application," the entire contents of which is incorporated by reference in its entirety. In an embodiment, sending this collected information to NIF server 405 may be accomplished using the procedures described in U.S. patent application Ser. No. 14/534,491 "System And Method for Exporting Real-Time User Equipment And Bearer State Information," the entire contents of which is hereby incorporated by reference in its entirety.

In step S602 of FIG. 8, the processor 406 of NIF 405 receives available video rates from one or more respective application functions 109a/115a associated with bearers of interest for the eNB 105a. In an embodiment, these video rates may be received from a HAS client 110a. In another embodiment, these video rates may be received from a video content server (CDN) that may be associated with application function 109*a*.

In step S604 of FIG. 8, the processor 406 of NIF server 405 may compute per UE policies, as described in the 'general operations' section of this document.

In step S606 of FIG. 8, the processor 406 of NIF server 405 may send the policies to a respective application function 109*a*/115*a* (whether this is an application function 115*a* of a client UE 110*a*, or an application function 109*a* in a CDN/video content server in IP-PDN 1001*a*).

It should be understood that an application function 109*a*/115*a*, for purposes of this method, may apply the policies to control video rates selected by HAS clients. In an embodiment, the application function may take advantage of NIF distributed policies, such that the application function may act as an Adaptive Rate Determination function, as described in U.S. Pat. No. 8,949,440 "System and Method for Adaptive Rate Determination in Mobile Video Streaming," which is hereby incorporated by reference in its entirety.

In an embodiment, the processor 406 of the NIF 405 may be used to set policies in order to direct an application function to control a network application as follows. The processor 406 may compute which HAS UEs are using a shared resource pool may be admitted by using an admission control scheme based upon Equation 2 (above), assign a maximal rate $R^{(k)}_{max}=0$ and maximal throughput $T^{(k)}_{max}=0$ for the UEs that are not admitted, and assign maximal rates $R^{(k)}_{max}=r^{(k)}$ for the admitted UEs where $r^{(k)}$-s are the rates from input (B) (listed above) that satisfy Equation 7 (below) and also maximize the utility function described in Equation 4.

$$\sum_{k=1}^{N'} \frac{r^{(k)}}{\overline{\alpha}_k} \leq \frac{Sx}{(1+\delta)}, \qquad \text{Equation 7}$$

It should be noted that Equation 7 differs from the Equation 2 in that the lowest rates $r_1^{(k)}$ is replaced with $r^{(k)}$ from the list of available rates of input (B). The utility function may be computed using Equation 4 for each permutation of the rates satisfying the Equations 5 and 7, and $r^{(k)}$ for each UE k may be selected so that the value of the utility function may be maximized. The processor 406 may then perform a step to assign a maximal throughput, using Equation 8.

$$T^{(k)}_{max}=(1+\delta 1)R^{(k)}_{max} \qquad \text{Equation 8}$$

Where δ1 is a configurable parameter that may be less than or equal to the δ in Equations 2 and 7.

Figure 9:
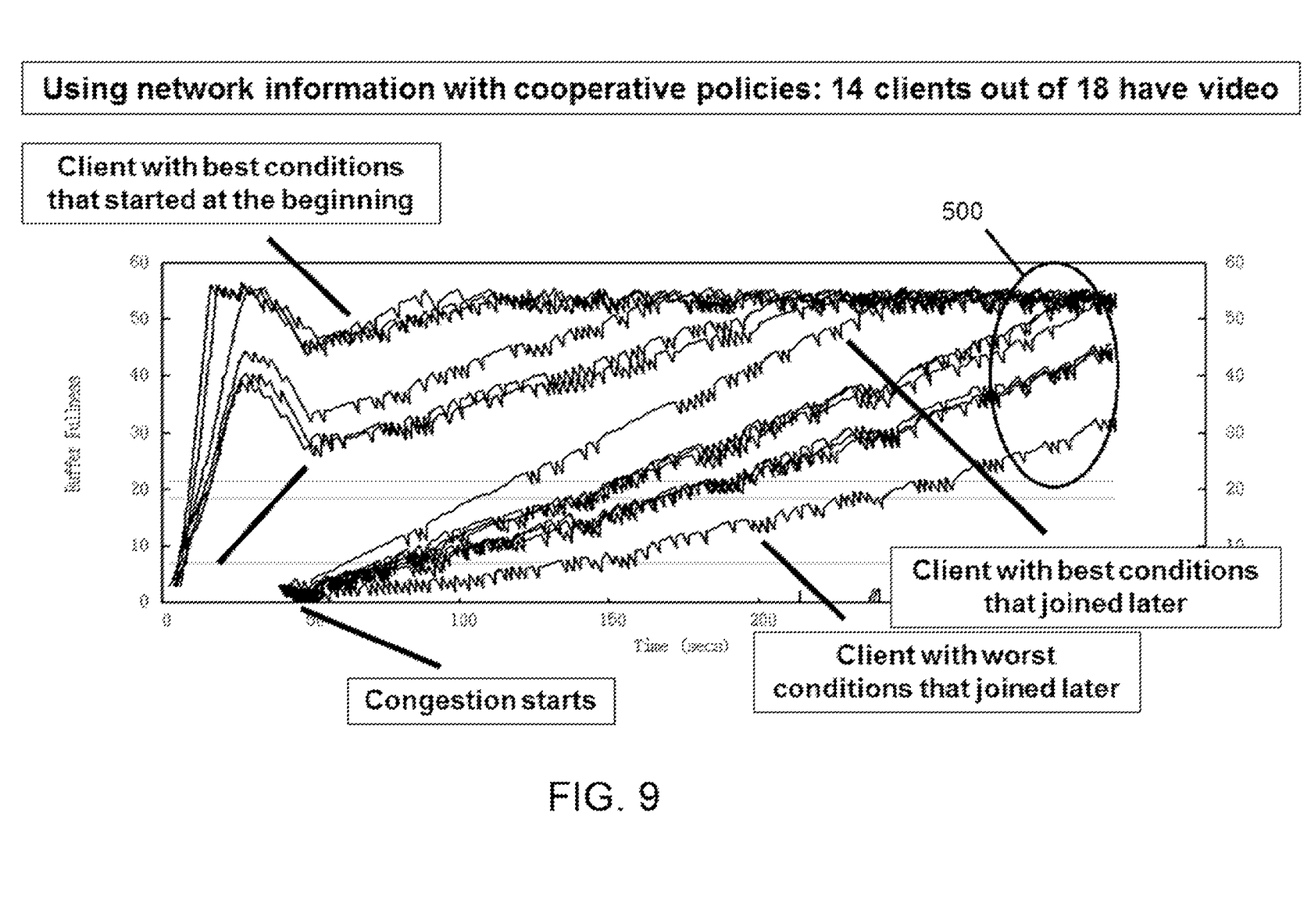
FIG. 9 graphically depicts HAS clients being served in a reconfigured wireless network, in accordance with an example embodiment.

Based on the example method described in FIG. 8, performance of a network may be greatly improved in order to allow a greater number of UEs 105*a* to run applications, such as HAS applications. For instance, as graphical depicted in FIG. 9, a simulation may result in a seven-fold improvement (increase) in a number of UEs capable of watching video. Instead of a mere 2 UEs 400*a* able to watch video (as in FIG. 3), instead there is a group of 14 UEs 500 admitted (with the remaining 4 denied), where all 14 admitted UEs 105*a* may play video.

It should be understood that the above methodology and systems are not limited to LTE IP-CAN. Rather, the methodology and systems may be implemented on any wireless technology (e.g., 2G, 3G, 4G, 5G, etc.) that utilizes an uplink or downlink scheduler to allocate physical resources (i.e., physical resource blocks or other resource units) of cells, where the wireless link throughput may be calculated as a function of the resource allocation and channel conditions metric. It also should be understood that with the Virtual Radio Access Network (VRAN) architecture, various components of NIF Agent 400 and NIF 405 may be distributed across multiple processing circuits and multiple physical nodes within VRAN or Virtualize Wireless Core clouds.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A method of cooperatively controlling an operation of an application in a wireless network, comprising:
   obtaining, by one or more processors of at least one network node, scheduled shared resource rate information and channel condition information for bearers sharing network resources, wherein the channel condition information includes an average number of useful bits per physical resource block (PRB), the useful bits being a number of data bits that are not retransmitted bits;
   receiving, by the one or more processors, available video rate information from one or more application functions associated with the bearers;
   computing, by the one or more processors, user equipment (UE) policies for user equipments (UEs) associated with the bearers based on the scheduled shared resource rate information, the channel condition information, and the available video rate information, the UE policies including throughput restrictions for the UEs; and
   exporting, by the one or more processors, the UE policies to the one or more application functions to cooperatively control an operation of an application being used by at least one of the UEs.

2. The method of claim 1, further comprising:
   ordering the UEs based on a channel condition metric derived from the channel condition information; and
   invoking admission controls for the UEs using the channel condition metric and the ordering of the UEs.

3. The method of claim 2, wherein,
   the invoking of admission controls includes admitting a first subset of the UEs to receive application services if a sum of an average aggregate value of the scheduled shared resource rate required to support playing videos with a minimal available video rate does not exceed an average aggregate rate of available network resources, wherein the average aggregate rate of available network resources includes a configurable margin factor,
   higher values of the channel condition metric correspond with better channel conditions.

4. The method of claim 1, wherein the scheduled shared resource rate information is an average aggregate physical resource block (PRB) rate that includes an average number of physical resource blocks (PRBs) expected to be allocated to all bearers carrying hypertext transfer protocol adaptive streaming (HAS) application traffic.

5. The method of claim 1, wherein the receiving of the available video rate information includes receiving hypertext transfer protocol adaptive streaming (HAS) video rates from one of a HAS client and a HAS network content server associated with the one or more application functions associated with the bearers.

6. The method of claim 1, wherein the computing of the UE policies includes calculating per UE tuples indicating the throughput restrictions for the UEs.

7. The method of claim 6, wherein the throughput restrictions include a maximal allowed video bitrate and a maximal allowed throughput for the UEs.

8. The method of claim 3, wherein the computing of the UE policies includes maximizing a Quality of Experience (QoE) utility function for the first subset of UEs.

9. A non-transitory computer readable medium having a program including instructions to perform the method of claim 1.

10. At least one network node, comprising:
one or more processors configured to,
obtain scheduled shared resource rate information and channel condition information for bearers sharing network resources, wherein the channel condition information includes an average number of useful bits per physical resource block (PRB), the useful bits being a number of data bits that are not retransmitted bits,
receive available video rate information from one or more application functions associated with the bearers,
compute user equipment (UE) policies for user equipments (UEs) associated with the bearers based on the scheduled shared resource rate information, the channel condition information, and the available video rate information, the UE policies including throughput restrictions for the UEs, and
export the UE policies to the one or more application functions to cooperatively control an operation of an application being used by at least one of the UEs.

11. The at least one network node of claim 10, wherein the one or more processors is further configured to,
order the UEs based on a channel condition metric derived from the channel condition information, and
invoke admission controls for the UEs using the channel condition metric and the ordering of the UEs.

12. The at least one network node of claim 11, wherein the one or more processors invokes the admission controls by admitting a first subset of the UEs to receive application services if a sum of an average aggregate value of the scheduled shared resource rate required to support playing videos with a minimal available video rate does not exceed an average aggregate rate of available resources, wherein the average aggregate rate of available resources includes a configurable margin factor,
wherein higher values of the channel condition metric correspond with better channel conditions.

13. The at least one network node of claim 10, wherein the scheduled shared resource rate information is an average aggregate physical resource block (PRB) rate that includes an average number of physical resource blocks (PRBs) expected to be allocated to all bearers carrying hypertext transfer protocol adaptive streaming (HAS) application traffic.

14. The at least one network node of claim 10, wherein the one or more processors receives the available video rate information by receiving hypertext transfer protocol adaptive streaming (HAS) video rates from one of a HAS client and a HAS network content server associated with the one or more application functions associated with the bearers.

15. The at least one network node of claim 10, wherein the one or more processors computes the UE policies by calculating per UE tuples indicating the throughput restrictions for the UEs.

16. The at least one network node of claim 15, wherein the throughput restrictions include a maximal allowed video bitrate and a maximal allowed throughput for the UEs.

17. The at least one network node of claim 12, wherein the one or more processors computes the UE policies by maximizing a Quality of Experience (QoE) utility function for the first subset of UEs.

18. The at least one network node of claim 16, wherein the one or more processors is further configured to calculate a minimal delay before requesting a next video segment based on the maximal allowed video bitrate.

* * * * *